United States Patent [19]

Ångström

[11] Patent Number: 4,669,318
[45] Date of Patent: Jun. 2, 1987

[54] APPARATUS FOR DYNAMOMETER TESTING OF MOTOR VEHICLES

[75] Inventor: Hans E. Ångström, Huddinge, Sweden

[73] Assignee: Nils G. Engstrom, Alvsjo, Sweden; a part interest

[21] Appl. No.: 817,840
[22] PCT Filed: Mar. 29, 1984
[86] PCT No.: PCT/SE84/00115
  § 371 Date: Nov. 27, 1985
  § 102(e) Date: Nov. 27, 1985
[87] PCT Pub. No.: WO85/04475
  PCT Pub. Date: Oct. 10, 1985

[51] Int. Cl.⁴ ............................ G01L 3/16; G01L 3/20
[52] U.S. Cl. ................................ 73/862.09; 73/862.14
[58] Field of Search ........................ 73/862.09–862.18

[56] References Cited

U.S. PATENT DOCUMENTS 3,277,702 10/1966 Brenneke .
3,902,360 9/1975 Cline .
3,940,978 3/1976 Akkerman et al. .
4,062,234 12/1977 Bartlett et al. .
4,161,116 7/1979 Fegraus et al. .
4,199,979 4/1980 Herr et al. .

FOREIGN PATENT DOCUMENTS 603714 10/1934 Fed. Rep. of Germany .
2139229 2/1973 Fed. Rep. of Germany .
2331562 1/1974 Fed. Rep. of Germany .
149120 7/1983 Norway .

Primary Examiner—Charles A. Ruehl
Attorney, Agent, or Firm—Hill, Van Santen, Steadman & Simpson

[57] ABSTRACT

Apparatus for dynamometer testing of motor vehicles comprising load absorbing means in the form of a hydrostatic pump assembly which has an input shaft adapted to have a flexurally rigid engagement with a driven vehicle shaft using a rigid coupling. The coupling is mounted on an end portion of the pump input shaft which projects in one direction from a holder that supports the pump assembly. The pump assembly is mounted for limited rotational movement relative to the holder and projects in cantilever fashion in the other direction from the holder. A ground engaging support comprising support wheels is secured to the holder. A strain gauge assembly is connected between the pump assembly and the holder and serves to measure the torque applied to the holder by the pump assembly.

10 Claims, 5 Drawing Figures

APPARATUS FOR DYNAMOMETER TESTING OF MOTOR VEHICLES

This invention relates to apparatus for dynamometer testing of motor vehicles, that is, apparatus adapted to be drivingly connected with a driven vehicle output shaft and comprising means for measuring one or more quantities significant to the performance of the engine and the transmission, such as the torque that the driven shaft applies to a power-absorbing device (brake) forming part of the test apparatus.

Known apparatus for dynamometer testing of motor vehicles usually comprises a ramp or a platform or some other kind of support for the entire vehicle or the end of the vehicle where the driven shaft is located. The support is provided with friction rollers connected to the dynamometer system which are engaged by the tires of the driven vehicle wheels. In dynamometer test apparatus of this type the unavoidable and unpredictably variable slipping and friction between the tires and the friction rollers often causes unacceptable inaccuracy of the test result.

In other known dynamometer test apparatus the friction rollers are replaced by shaft couplings through which the driven vehicle shaft is non-slippingly connected with the dynamometer system. Such apparatus comprises a hoisting device for raising the vehicle so that the driven wheels can be rotated without engaging the supporting structure. The shaft couplings are flexible so that substantially only torque is applied to the dynamometer system by the driven shaft.

Both types of dynamometer test apparatus are bulky and costly. For this and other reasons they are used almost exclusively in large maintenance installations and laboratories where dynamometer testing is carried out frequently enough to warrant the installation of bulky and expensive test equipment.

An object of the invention is to provide dynamometer test apparatus that does not require a platform or similar support for the vehicle and thus is easy to transport, that lends itself to use both in maintenance installations or laboratories and in the field, and that is cheaper than the known stationary apparatus and yet permits testing with the same degree of accuracy as known apparatus of the type having a non-slip connection of the driven shaft to the dynamometer system.

The invention is directed to apparatus for dynamometer testing of motor vehicles which, like the known types of apparatus discussed above, comprises a dynamometer having a stator, a rotor mounted for rotation in the stator and engageable with a driven vehicle power output shaft for rotation therewith, a stator holder supporting the stator and connected therewith to carry the torque loading on the dynamometer, and means for measuring the torque loading on the dynamometer. According to the invention, such apparatus is characterised in that the rotor is provided with means for flexurally rigid coupling of the rotor to the driven vehicle shaft adjacent one side of the stator holder, in that the greater portion of the stator and the rotor extend in cantilever fashion from the opposite side of the stator holder, and in that the stator holder is provided with a ground engaging support.

Thus, according to the invention, the dynamometer rotor is adapted to have a flexurally rigid connection with the driven vehicle shaft, and the stator holder also serves the purpose of carrying the weight of the dynamometer and at least part of the weight of the vehicle.

Since in actual practice the driven vehicle shaft always has a differential and thus comprises two half-shafts which are driven from a common power source but are rotatable relative to each other, the use of apparatus according to the invention comprises the use of two basically identical test units which are connected to different half-shafts. In order that the difference between the rotational speeds of the half-shafts may be kept within a predetermined narrow range, the two test units may be controlled by a common measuring and control system which varies the load absorbed by one or the other of the units in dependence of a measured speed difference.

A more detailed description of an exemplary embodiment follows, reference being had to the accompanying drawings, in which.

Figure 1:
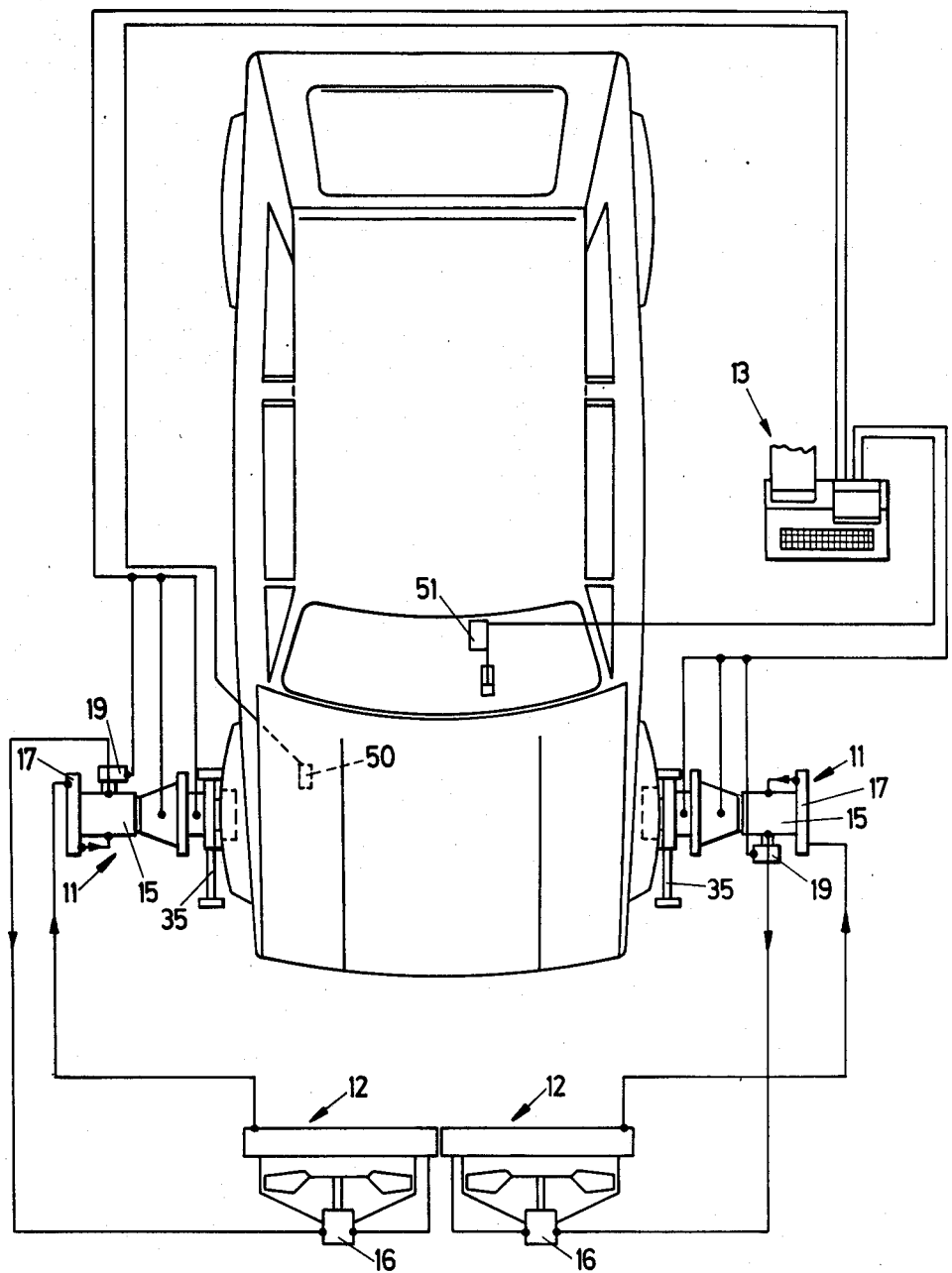
FIG. 1 is a diagrammatic plan view of a private car and a dynamometer test system comprising two test units embodying the invention which are connected to driven front half-shafts of the car.

As shown in FIG. 1, the dynamometer test system comprises a pair of test units 11, a pair of cooling units 12 connected to different test units and comprising hydrostatically driven cooling fans, and a measuring and control system 13. The two assemblies formed by the two test units 11 and the respective associated cooling units 12 are basically identical and operate in the same way. As is evident from FIG. 1 the two assemblies are connected to the common measuring and control system 13. The following description is only directed to one of the test units 11 and the associated cooling unit 12 but is applicable to the other test unit 11 and the associated cooling unit 12 as well.

In the embodiment shown by way of example, the test unit 11 comprises a dynamometer in the form of a hydrostatic pump assembly 15 provided with means for measuring the torque applied to the pump input shaft. A portion of the liquid flow produced by the pump assembly 15—which comprises two commonly driven pumps 15A and 15B—is passed to a hydrostatic motor 16 driving a fan of the cooling unit 12 and then through a cooler 12A of the cooling unit and back to a tank 17, the remaining portion being passed direct to the tank through a control valve 19. The use of a hydrostatic pump assembly as power-absorbing means in the dynamometer is advantageous and thus preferable, but the invention can also be realized with other types of power-absorbing means, such as a disc brake.

Figure 3:
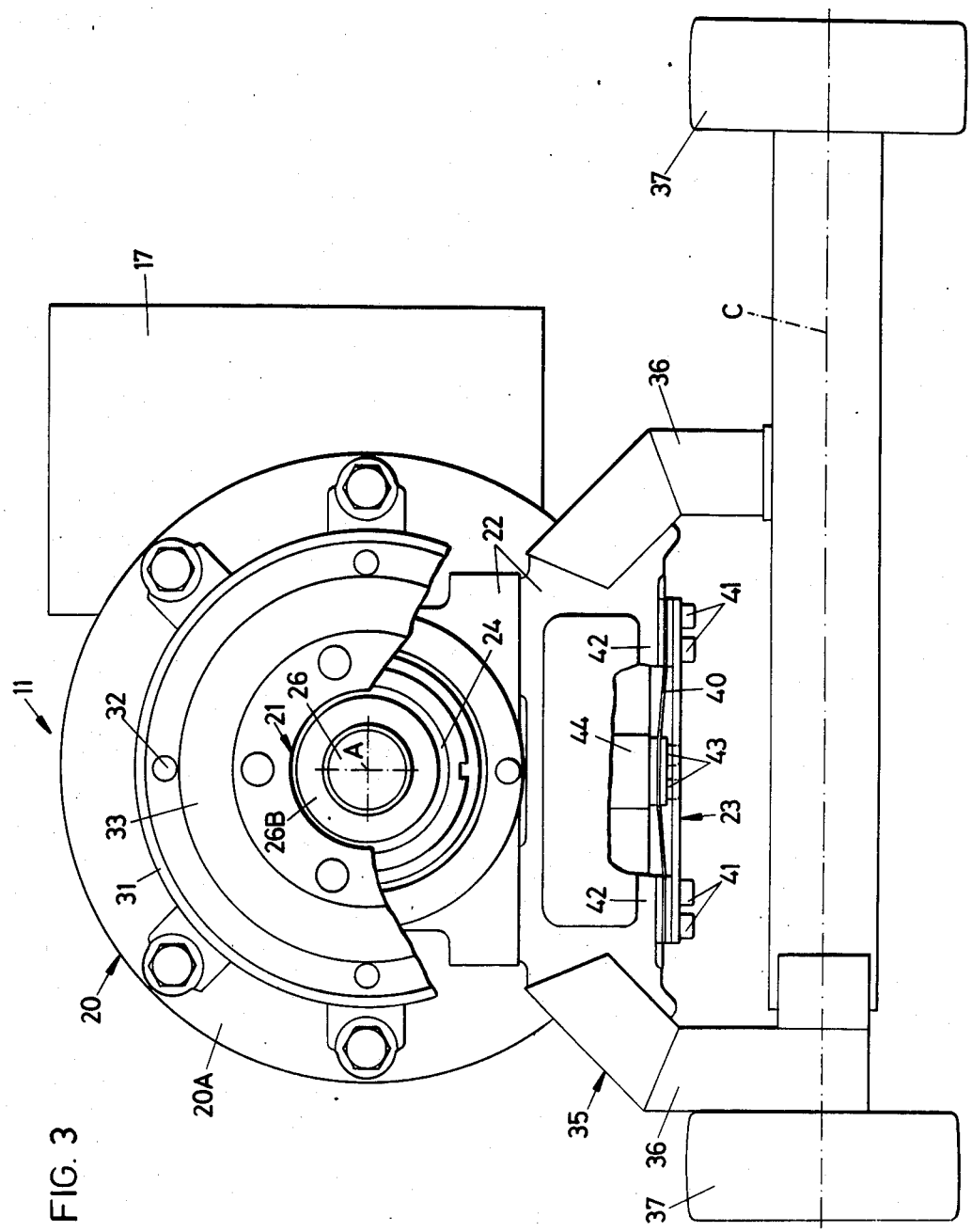
FIG. 3 is an end view from the left in FIG. 2, certain portions being broken away.
Figure 4:
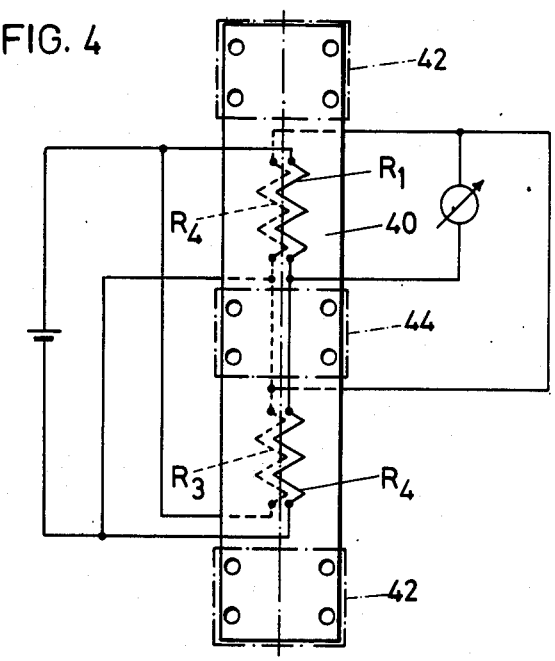
FIG. 4 is an electrical circuit diagram of a strain gauge arrangement.

Described in more general terms the dynamometer comprises a stator 20, a rotor 21 mounted for rotation in the stator, a stator holder 22 supporting the stator and carrying the torque applied to the dynamometer by the driven vehicle shaft, and a device 23 for sensing the torque loading on the stator holder. The just-mentioned components are shown in greater detail in FIGS. 2 to 4.

Figure 2:
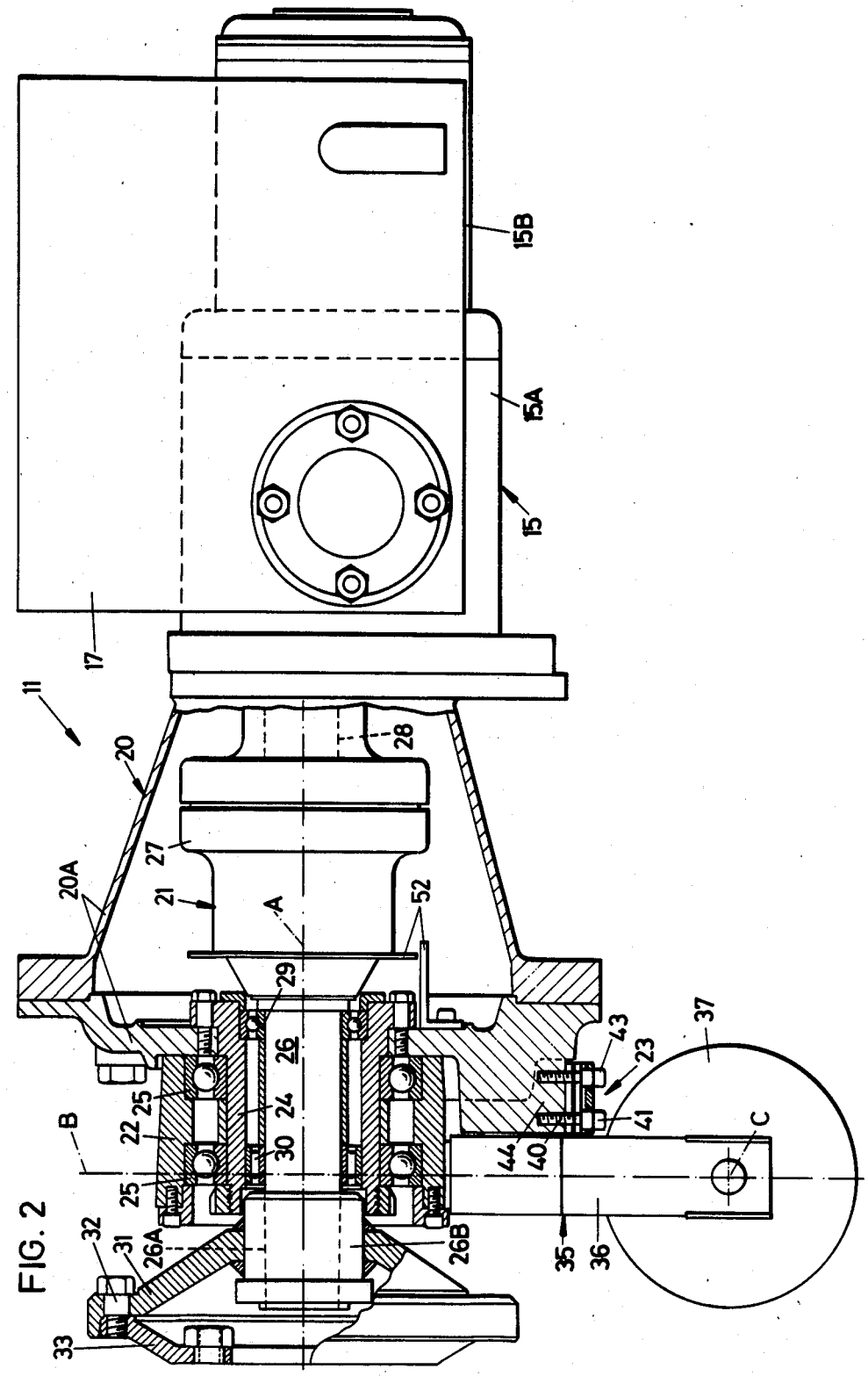
FIG. 2 is a lateral view, partly in axial section, of one of the test units.

The stator 20 comprises a casing or housing 20A to one side of which the housing of the hydrostatic pump assembly 15 is attached. On its opposite side the stator housing has a tubular extension or collar 24 by which it is journalled for rotational movement within and coaxially with the annular stator holder 22 on a pair of antifriction bearings 25. As best shown in FIG. 2, the main portion of the stator housing 20A with the attached pump assembly 15 projects in cantilever fashion from one side of the stator holder 22.

The rotor 21 is formed by a shaft 26 and other elements secured to the shaft, such as the pump input shaft 28, which is connected with the shaft 26 for rotation therewith through a coupling 27. The rotor shaft 26 extends coaxially through the stator collar 24 and is rotatably mounted in the collar on antifriction bearings 29, 30. The end portion 26A of the rotor shaft 26 remote from the coupling 27 projects slightly from the stator holder 22 and is provided with a clamped-on collar 26B. To this collar is welded a circular coupling flange 31. As shown in FIG. 2, the coupling flange 31 is positioned immediately adjacent the side of the stator holder 22 which is remote from the stator housing 20A and the pump assembly 15.

As also shown in FIG. 2, the coupling flange 31 is rigidly but releasably secured by means of bolts 32 to a circular plate 33, hereinafter termed adapter plate, which is axially aligned with the coupling flange 31 and thus with the rotor shaft 26. The adapter plate 33 is adapted to fit the outer or wheel-carrying end of the half-shaft of the car and to be secured by bolts or nuts to that end in place of the rim of the wheel. Accordingly, it is necessary on each occasion to select an adapter plate suited for the car to be tested.

An important feature of the test unit is that there is a flexurally rigid connection between, on the one hand, the adapter plate 33 and, hence, the driven vehicle shaft to which the test unit is to be connected, and, on the other hand, the rotor 21 and, in the illustrated embodiment, also the stator housing 20 and the stator holder 22. Since a major portion of the test unit 11 projects in cantilever fashion from the stator holder 22, a consequence of the flexurally rigid connection is that the coupling flange 31 and the rotor shaft 26 are subjected to a substantial bending moment in addition to the torque to be measured. Naturally, this has to be taken into consideration in the dimensioning and the structural design of the test unit.

Firmly secured to the underside of the stator holder 22 is a rigid ground engaging support which is generally designated 35 and serves both the purpose of carrying the weight of the stator holder and the elements of the test unit supported thereby as well as a portion of the weight of the car being tested, and of preventing the stator holder from rotating. The ground engaging support 35 comprises a pair of legs 36 which are spaced apart in a vertical plane B perpendicular to the axis A of rotation of the rotor 21 and which are provided with support wheels 37 whose common axis C of rotation is horizontal and contained in the plane B. The legs 36 with the support wheels 37 are positioned on opposite sides of the vertical plane containing the rotor axis A, see FIG. 3.

During the testing, the ground engaging support 35 thus carries a major portion of the weight of the test unit 11 and a substantial portion of the weight of the vehicle, the support wheels 37 permitting the car and the test unit to move laterally without any appreciable forces being thereby applied to the test unit. Moreover, the support wheels 37 facilitate the handling of the test unit 11 so that the test unit can conveniently be moved towards and away from the car.

The means for measuring the torque applied to the stator holder 22—for practical purposes this torque may be equated with the torque applied to the rotor shaft 26 by the driven vehicle axis—comprises an elastic steel strip 40 of uniform width subjected to a tensile prestress which strip has its ends firmly clamped to a pair of lugs 42 on the stator holder 22 by screws 41 and has its central portion firmly clamped to a lug 44 on the stator housing 20A by screws 43. This strip 40 forms a link which transmits tensile forces between the stator holder and the stator which would be free to rotate relative to each other with very small frictional resistance if the strip were absent. The amount of relative rotational movement that is permitted is determined by the elongation of the strip caused by the transmitted tensile force.

Advantageously, the tensile force prestressing the strip 40 is at least slightly greater than the greatest tensile force the strip has to transmit between the stator and the stator holder in operation. In other words, the tensile prestress should be sufficient to ensure that the strip is always prestressed in tension during operation of the test unit.

At least one strain gauge element is secured in well-known manner to each of the two sections of the strip 40 which are positioned between the stator lug 44, on the one hand, and each of the stator holder lugs 42, on the other hand. The strain gauges are shown only in the circuit diagram of FIG. 4 where four strain gauge elements are provided which are shown as resistors $R_1$, $R_2$, $R_3$, $R_4$ forming the branches of a Wheatstone bridge circuit in well-known manner. The strain gauge elements are positioned near the longitudinal center line of the strip 40, the strain gauge elements $R_1$ and $R_4$ being positioned on the strip section on one side of the stator lug 44 and the strain gauge elements $R_2$ and $R_3$ being positioned on the strip section on the other side of the stator lug.

When a force is transmitted from the stator to the stator holder, the tensile stress of the strip 40 will increase on one side of the stator lug 44 and decrease on the other side of the stator lug. As a consequence, the resistance of one pair, e.g. $R_1$, $R_4$, of strain gauge elements will be changed in one sense, e.g. increase, while the resistance of the other pair, $R_2$, $R_3$, will be changed in the opposite sense. The consequent imbalance of the bridge is measured in well-known manner and the measured value is used for the determination of the magnitude of the transmitted force, which is proportional to the torque reaction between the stator and the stator holder.

In the illustrated exemplary embodiment, the strip 40 has been prestressed by first clamping the ends of the straightened strip firmly to the stator holder lugs 42 and then displacing the central strip portion by clamping it to the stator lug 44. It is to be understood, however, that the strip can be prestressed in other ways without departing from the scope of the invention.

Because of the central and symmetrical positioning of the strain gauge elements on the strip 40, the torque sensing means 23 is insensitive to any axial and/or radial play of the stator relative to the stator holder. Moreover, because of the constant prestress, there is no play or friction in the connection between the stator and the stator holder formed by the strip.

It should also be noted that the above-described arrangement comprising an elastic strip prestressed in tension and forming part of a system for measurement of forces using strain gauges is also useful in applications other than that described above.

Figure 5:
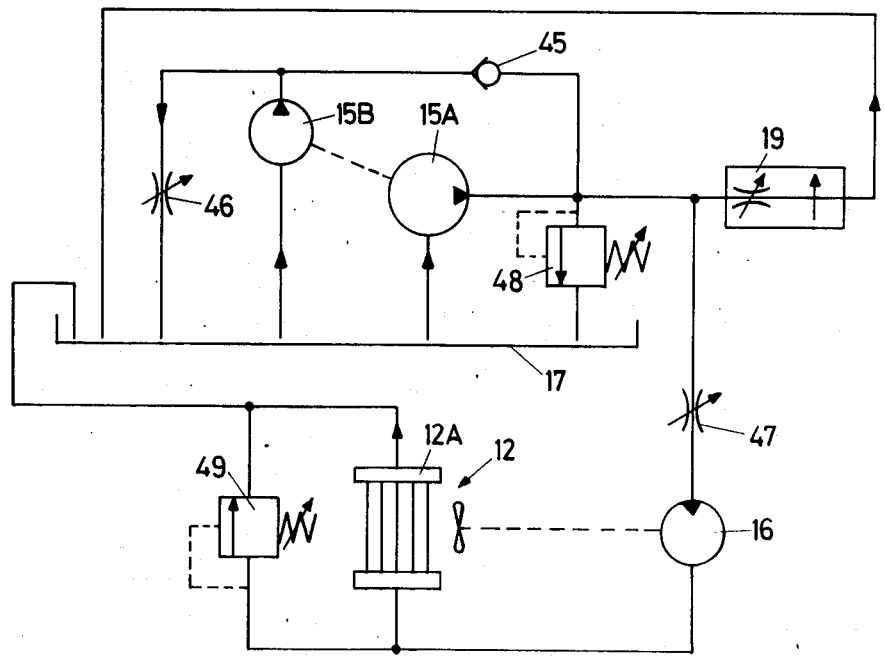
FIG. 5 is a hydraulic circuit diagram.

FIG. 5 is a hydraulic circuit diagram for the test unit 11 and the associated cooling unit 12. Both pumps 15A, 15B of the pump assembly 15, which are drivingly interconnected and thus are both driven by the rotor shaft 26, have their inlets connected to the tank 17. In a conduit interconnecting the outlets of the pumps a non-return valve 45 is inserted which permits flow from the outlet of the pump 15B to the outlet of the pump 15A but not in the opposite direction. A conduit comprising a shut-off valve 46 connects the outlet of the pump 15B to the tank. A conduit comprising a control valve 47 connects the hydrostatic fan motor 16 to the outlet of the pump 15A to which a relief valve 48 is also connected. The flow discharged from the motor 16 passes through the cooler 12A of the cooling unit 12 and back to the tank 17. A conduit comprising a relief valve 49 bypasses the cooler 12A in the event of an excessive pressure drop across the cooler.

Connected in parallel with the flow path comprising the fan motor 16 and the cooler 12A is the above-mentioned control valve 19, which is a pressure-compensated valve, i.e. a valve that passes a flow of predetermined volumetric rate—in the present case adjustable—regardless of the magnitude of the pressure drop across it. The setting of the valve 19 is governed by the measuring and control system 13 such that the valve 19 passes a flow the volumetric rate of which is related to the desired rotational speed of the rotor 21, i.e. of the driven vehicle shaft. Because only a portion of the flow is passed to the cooling unit 12, the conduits connecting the cooling unit 12 with the test until 11 may be of relatively small diameter. This is a considerable advantage, because these conduits are normally of substantial length, while the conduit between the valve 19 and the tank 17 is very short.

While the test is being carried out, the cooling unit is positioned such that the air stream passing through the cooler 12A not only cools the hydraulic fluid heated in the pump assembly but also cools the engine of the car under test.

The above-described arrangement with the pump assembly comprising two pumps has certain economical and practical advantages (for example, if necessary, one of the pumps may serve as a motor), but it is also possible to use a single pump.

The test system illustrated in FIG. 1 also includes a fuel meter 50 connected to the measuring and control system 13. Moreover, this system is connected to an accelerator actuator 51 operating the accelerator pedal of the car under test in dependence of signals from the system 13 to set the engine to the desired speed or load.

As the test is carried out, the measuring and control system 13 controls the two test units 11 such that their speeds as sensed by speed sensors 52 do not deviate from one another or the desired speed by more than a certain value. At least with the types of vehicles for which the apparatus according to the invention is primarily intended, that is, private cars and other light motor vehicles, the speed is always well above the critical frequency of the swinging system formed by the driven vehicle shaft, the suspension and the test unit 11.

When carrying out a test using apparatus according to the invention, the moment about the axis of the wheels 37 caused by the portion of the weight of the vehicle carried by the test unit 11 should as nearly as possible balance the opposed moment caused by the weight of the test unit. Therefore, the distance between the adapter plate 33 and the support plane B should be determined so as to suit the most frequently occurring cases. Naturally, it is within the scope of the invention to provide means for adjusting that distance.

I claim:

1. Apparatus for dynamometer testing of motor vehicles, comprising a dynamometer having a stator, a rotor journalled for rotation in the stator and engageable with a driven vehicle power output shaft for rotation therewith, a stator holder supporting the stator and connected therewith to carry the torque loading on the dynamometer, and means for measuring the torque loading on the dynamometer, characterised in that the rotor (21) is provided with means (31) for flexurally rigid coupling of the rotor to the driven vehicle shaft adjacent one side of the stator holder (22), in that the greater portion of the stator (20) and the rotor (21) extend in cantilever fashion from the opposite side of the stator holder (22), and in that the stator holder is provided with a ground engaging support (35).

2. Apparatus according to claim 1, characterised in that the coupling means of the rotor (21) comprises a first rigid coupling member (31) which is rigidly secured to a projecting end portion of a rotor shaft (26) extending through the stator holder (22) and which is rigidly engageable with a second rigid coupling member (33) adapted to be rigidly secured to the driven vehicle shaft.

3. Apparatus according to claim 1, characterised in that the ground engaging support (35) comprises two spaced limbs (36) extending in a plane (B) perpendicular to the axis (A) of rotation of the rotor (21) and provided with the supporting wheels (37) whose axes (C) of rotation are parallel to the said plane.

4. Apparatus according to claim 1, characterised in that the stator (20) is mounted for rotational movement relative to the stator holder (22) and in that the means (40) for measuring the torque loading on the dynamometer interconnect the stator and the stator holder to restrain relative rotational movement of the stator and the stator holder.

5. Apparatus according to claim 4, characterised in that the stator (20) is supported in the stator holder (22) by a tubular stator member (24) mounted for rotational movement relative to the stator holder (22) on antifriction bearings (25) and in that the rotor (21) is mounted for rotation on antifriction bearings (29, 30) within and concentrically with the tubular stator member (24).

6. Apparatus according to claim 4, characterised in that the means for measuring the torque loading on the dynamometer include an elastic strip (40) subjected to a tensile prestress and mounted as a tensile-force transmitting link between the stator (20) and the stator holder (22), the end portions of the strip being firmly secured to either one (22) of the stator (20) and the stator holder (22) and its central portion being firmly secured to the other (20) of the stator and the stator holder, and a pair of strain gauges ($R_1/R_4$–$R_2/R_3$) secured to the strip on different sides of the central strip portion and connected in opposed relation to one another in an electrical measuring bridge circuit.

7. Apparatus according to claim 6, characterised in that the strip (40) is prestressed under the action of a force acting transversely of the longitudinal direction of the strip at the central strip portion.

8. Apparatus according to claim 1, characterised in that the dynamometer comprises a hydrostatic pump (15A, 15B) having a mechanical driving connection with the rotor (21) and a hydrostatic driving connection with a hydrostatic fan motor (16).

9. Apparatus according to claim 8, characterised by a valve (19) for diverting a controlled portion of the pump output flow from the fan motor (16).

10. Apparatus according to claim 9, characterised in that the fan motor (16) is drivingly connected to a fan and in that means (12A) is provided to subject the portion of the pump output flow delivered to the fan motor (16) to the cooling action of an airstream produced by the fan.

* * * * *